United States Patent
Tester et al.

(10) Patent No.: US 7,484,239 B1
(45) Date of Patent: Jan. 27, 2009

(54) DETECTING HEAP AND STACK EXECUTION IN THE OPERATING SYSTEM USING REGIONS

(75) Inventors: Jonathan Tester, Encinitas, CA (US); Sunita Verma, Palo Alto, CA (US)

(73) Assignee: Symantec Corporation, Cupertino, CA (US)

( * ) Notice: Subject to any disclaimer, the term of this patent is extended or adjusted under 35 U.S.C. 154(b) by 878 days.

(21) Appl. No.: 11/000,817

(22) Filed: Nov. 30, 2004

(51) Int. Cl.
  *G06F 17/30* (2006.01)
  *G06F 12/14* (2006.01)
  *H04L 9/00* (2006.01)
(52) U.S. Cl. .................. 726/2; 726/1; 726/22; 726/26; 713/164; 713/165; 713/166; 713/167; 717/127
(58) Field of Classification Search .................. 726/22, 726/2; 713/164
  See application file for complete search history.

(56) References Cited

U.S. PATENT DOCUMENTS

| 6,412,071 B1 | 6/2002 | Hollander et al. | |
|---|---|---|---|
| 2003/0204745 A1* | 10/2003 | Abrams | 713/201 |
| 2004/0177263 A1* | 9/2004 | Sobel et al. | 713/200 |
| 2005/0091439 A1* | 4/2005 | Mohideen et al. | 711/1 |
| 2005/0166001 A1* | 7/2005 | Conover et al. | 711/100 |
| 2005/0172126 A1* | 8/2005 | Lange et al. | 713/166 |

OTHER PUBLICATIONS

"HP-UX Memory Management White Paper, Version 1.3", Hewlett-Packard Company, Apr. 7, 1997, pp. 1-116 [online]. Retrieved from the Internet: <URL:http://docs.hp.com/en/5965-4641/5965-4641.pdf>.
"HP-UX Memory Management White Paper, Version 1.4", Hewlett-Packard Company, Sep. 22, 2000, pp. 1-69 [online]. Retrieved from the Internet:<URL:http://docs.hp.com/en/1218/mem_mgt.html>.
"HP-UX Process Management White Paper, Version 1.3", Hewlett-Packard Company, Apr. 7, 1997, pp. 1-124 [online]. Retrieved from the Internet:<URL:http://docs.hp.com/en/5965-4642/5965-4642.pdf>.
Salzman, Peter J., "*Using GNU's GDB Debugger Breaking and Stepping*", pp. 1-6 [online]. Retrieved from the Internet:<URL:http://www.dirac.org/linux/gdb/04-Breaking_And_Stepping.php>.
Szor, P., U.S. Appl. No. 10/681,623, filed Oct. 7, 2003 and entitled "Unmapped Code Blocking System and Method".
"*Memory Management White Paper, Version 1.3*", Hewlett-Packard Company, Apr. 7, 1997, pp. 1-116 [online]. Retrieved from the Internet:<URL:http://docs.hp.com/en/5965-4641/5965-4641.pdf>.

* cited by examiner

*Primary Examiner*—Kambiz Zand
*Assistant Examiner*—Jenise E Jackson
(74) *Attorney, Agent, or Firm*—Gunnison, McKay & Hodgson, L.L.P.; Serge J. Hodgson (57) ABSTRACT

A call to a critical operating system function is stalled. The pregion and pregion type associated with the location of a call module originating the call is determined. In one embodiment, when the pregion type is either a stack or a heap pregion type, protective action is taken, such as terminating the call, otherwise the call is released. In another embodiment, when the pregion type is either a text or shared memory pregion type, the call is released, otherwise protective action is taken.

20 Claims, 5 Drawing Sheets

DETECTING HEAP AND STACK EXECUTION IN THE OPERATING SYSTEM USING REGIONS

BACKGROUND OF THE INVENTION

1. Field of the Invention

The present invention relates to the protection of computer systems. More particularly, the present invention relates to a method and apparatus for detecting attempted exploitation of a computer system by malicious code, such as by a buffer overflow.

2. Description of Related Art

Often code written by programmers does not perform proper bounds checking when reading data from a file or an external source leaving it vulnerable to buffer overflow. Due in part at least to the large number of potentially vulnerable computer systems, buffer overflow is one of the most common forms of security exploits.

Buffers are memory areas, which generally hold a predefined amount of finite data. A buffer overflow occurs when a program attempts to store data into a buffer, where the data is larger than the size of the buffer. When the data exceeds the size of the buffer, the extra data can overflow into the adjacent memory locations. In this manner, it is possible to corrupt valid data and possibly to change the execution flow and instructions in the stack.

Two buffers commonly exploited by buffer overflows are the stack and heap. A stack is a static region of memory utilized by a program to hold local variables, return addresses, and data used by the program's subroutines. A heap is a dynamically allocated region of memory for use by a program.

By exploiting a buffer overflow in these memory areas, it is possible to inject malicious code, sometimes called malicious shellcode, into the execution flow. This shellcode allows remote system level access, giving unauthorized access to not only malicious hackers, but also to replicating malicious code, e.g., computer worms.

SUMMARY OF THE INVENTION

In accordance with one embodiment, a method includes hooking at least one critical operating system function and stalling a call to the at least one critical operating system function, where the call originates from a call module at a location in a virtual address space allocated to a process. A pregion associated with the location is determined, and a pregion type of the pregion is determined.

In one embodiment, a determination is made whether the pregion type is one of a stack pregion type or a heap pregion type. When the pregion type is either one of a stack pregion type or a heap pregion type, protective action is taken, otherwise the call is released.

In another embodiment, a determination is made whether the pregion type is a text pregion type. When the pregion type is a text pregion type, the call is released. Otherwise, when the pregion type is not a text pregion type, a determination is made whether the pregion type is a shared memory pregion type. When the pregion type is said shared memory pregion type, the call is released. Otherwise, when the pregion type is not a shared memory pregion type, protective action is taken.

Embodiments in accordance with the present invention are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Stack and heap segments of virtual memory are frequently used by buffer overflow exploits to inject malicious code into the execution flow of a process. Embodiments in accordance with the present invention detect code executing from either stack or heap segments of virtual memory by determining the type of pregion in the kernel process structure associated with the code.

Figure 2:
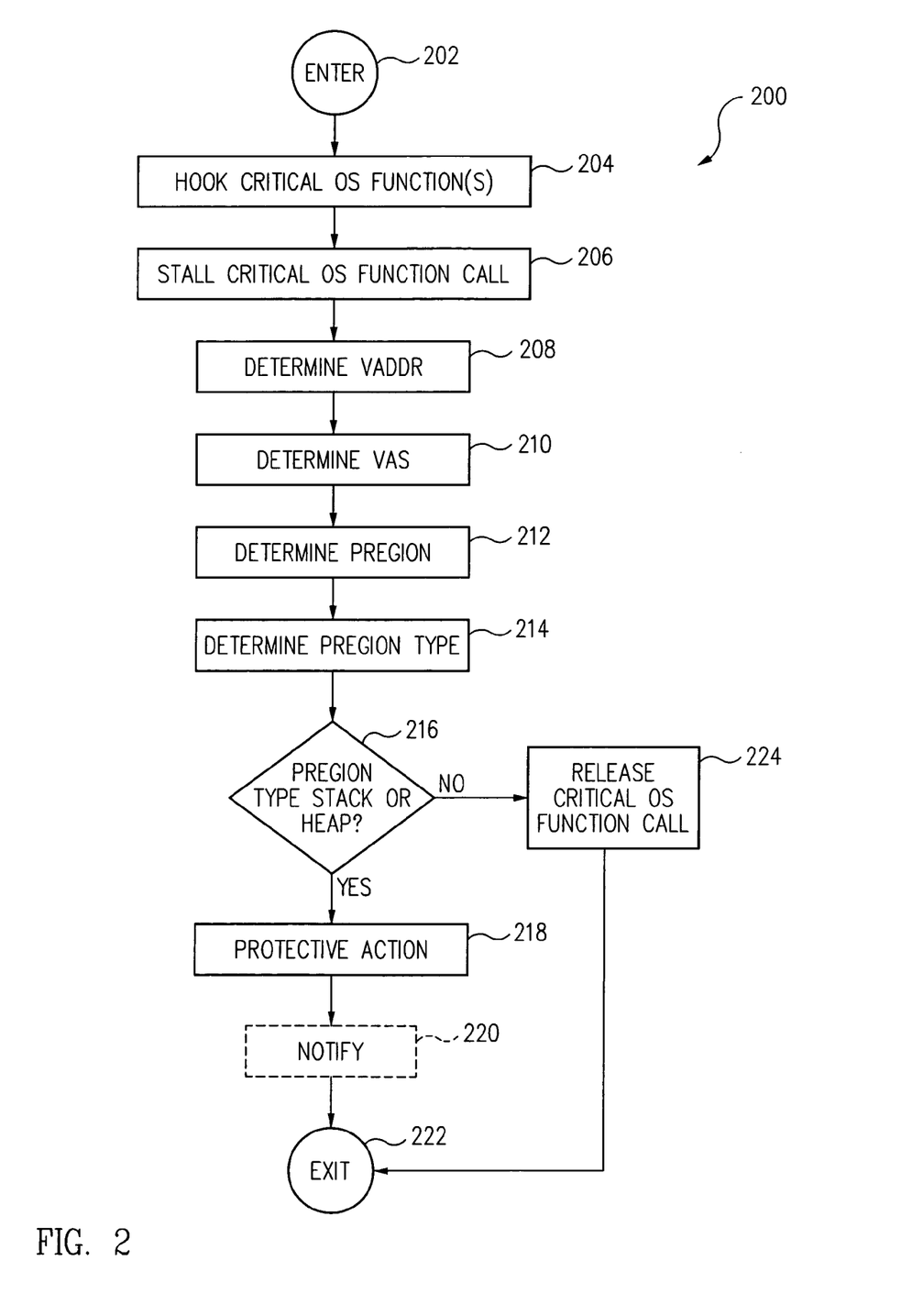
FIG. 2 illustrates a flow diagram of a method implemented by the detection application of FIG. 1 in accordance with one embodiment of the invention.

In accordance with one embodiment of the invention, referring to FIG. 2, a method includes hooking critical OS functions, for example, using a hooked system call table (operation 204). A call to a critical OS function, which originates from a call module of a currently running process, is stalled (operation 206) and the virtual address of the call module is determined (operation 208).

The virtual address space of the currently running process is determined (operation 210), and a pregion associated with the virtual address of the call module within the virtual address space is determined (operation 212). The pregion type of the pregion is determined (operation 214) and a determination is made whether the pregion type is either stack or heap (operation 216).

When the pregion type is either stack or heap, the call to the critical OS function is assumed to originate from a malicious call module (e.g., from a buffer overflow exploit), and the critical OS function call is terminated (operation 218). Otherwise, when the pregion type is not either stack or heap, the call to the critical OS function is assumed to originate from a non-malicious call module (e.g., not from a buffer overflow exploit), and the call to the critical OS function is released (operation 224). Optionally, a notification is provided to a user or other entity, such as a system administrator (operation 220). By terminating critical OS function calls assumed to originate from malicious call modules, embodiments in accordance with the invention prevent execution of critical OS function calls that would otherwise allow unauthorized remote access.

Embodiments in accordance with the invention are described herein with reference to implementation on computer systems utilizing a HP-UX operating system (Hewlett-Packard Company, Palo Alto, Calif.), and in particular HP-UX memory management processes that support region identification in the kernel. However, embodiments in accordance with the invention are applicable to other operating systems that support region identification in the kernel, for example, the Advanced Interactive executive (AIX) operating system (International Business Machines Corporation, Armonk, N.Y.).

Herein, in one embodiment, malicious code is defined as any computer program, module, set of modules, or code that enters a computer system environment without an authorized user's knowledge and/or without an authorized user's consent. Further, herein, a malicious call module is defined as any call module associated with malicious code. A non-malicious call module is defined as any call module not associated with malicious code.

Figure 1:
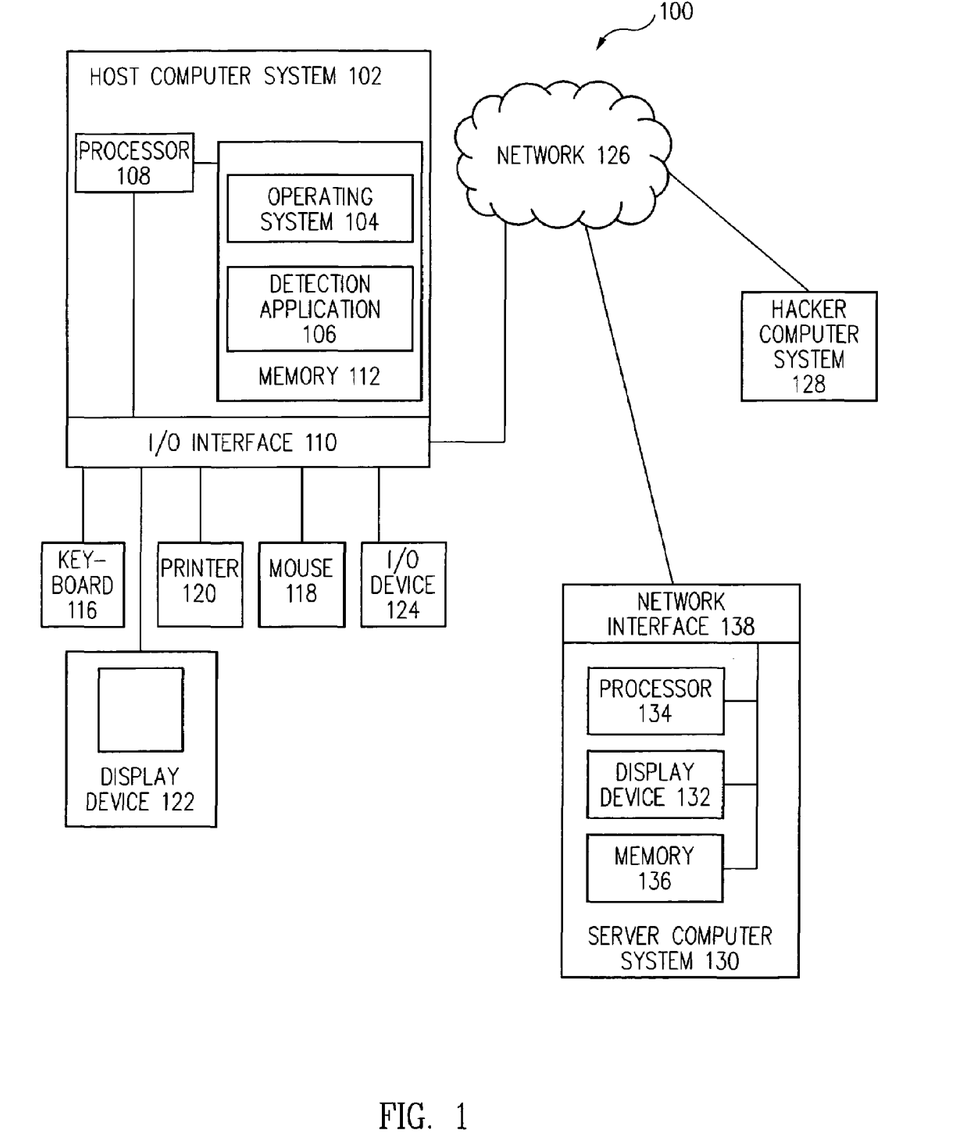
FIG. 1 is a diagram of a system that includes a detection application executing on a host computer system in accordance with one embodiment of the present invention.

In particular, FIG. 1 is a diagram of a system 100 that includes a detection application 106 executing on a host computer system 102 in accordance with one embodiment of the present invention. Host computer system 102, can be a stand-alone computer system, such as a personal computer or workstation, as illustrated in FIG. 1. Host computer system 102 (e.g., a first computer system) can also be part of a client-server configuration that is also illustrated in FIG. 1 in which computer system 102 interacts with a server computer system 130 (e.g., a second computer system) via a network 126. Network 126 can be any network or network system that is of interest to a user, for example, the Internet.

Detection application 106 is described herein as executed on host computer system 102, however, in light of this disclosure, those of skill in the art can understand that the description is applicable to a client-server system as well. Host computer system 102 typically includes a central processing unit (CPU) 108, hereinafter processor 108, an input/output (I/O) interface 110, an operating system 104, and a memory 112.

Host computer system 102 may further include standard devices, such as a keyboard 116, a mouse 118, a printer 120, and a display device 122, as well as, one or more standard input/output (I/O) devices 124, such as a compact disk (CD) or DVD drive, floppy disk drive, or other digital or waveform port for inputting data to and outputting data from host computer system 102. In one embodiment, memory 112 includes a main memory, as well as any supplemental memories, and includes executable areas, data storage areas, and any memory areas needed by host computer system 102.

In one embodiment, detection application 106 is loaded into host computer system 102 via I/O device 124, such as from a CD, DVD or floppy disk containing detection application 106. In other embodiments, such as client-server embodiments, detection application 106 can be downloaded into host computer system 102 from server computer system 130 via network 126. Server computer system 130 can further include: a network interface 138 for communicating with network 126; a memory 136; a processor 134, and a display device 132. In various embodiments, network interface 138 and I/O interface 110 include analog modems, digital modems, or a network interface card.

In FIG. 1, host computer system 102 is also coupled to a hacker computer system 128 by network 126. In one embodiment, hacker computer system 128 is similar to host computer system 102, for example, includes a central processing unit, an input/output (I/O) interface and a memory. Hacker computer system 128 may further include standard devices like a keyboard, a mouse, a printer, a display device, and an I/O device(s). The various hardware components of hacker computer system 128 are not illustrated to avoid detracting from the principles of the invention.

In the present embodiment, operating system 104 is a HP-UX operating system that utilizes a virtual memory management system and supports region identification in the kernel. Although region identification in the HP-UX operating system is well known to those of skill in the art, a brief description is provided to enhance understanding of the embodiments of the invention described herein.

Generally, when a process (e.g., a running program) is created, the HP-UX operating system kernel allocates a virtual address space for that process in virtual memory. The virtual address space is a range of memory locations in virtual memory. The virtual address space is divided into logical segments of virtually contiguous pages that are mapped to physical addresses in memory (which may not be contiguous).

When a program is compiled, the compiler generates virtual addresses for the code. User programs use virtual addresses. The virtual addresses are mapped to physical addresses in order for the compiled code to execute. A page is the smallest unit of physical memory that can be mapped to a virtual address.

The virtual address space allocated to a process is generally divided into different process segments, including text, heap (also sometimes called data), stack, and shared memory. Typically, the text segment contains a process's instructions; the heap segment contains data structures; the stack segment contains local variables and subroutine return addresses; and the shared memory segment contains address space that is shareable among multiple processes. As earlier described, stack and heap areas of memory are extensively used by buffer overflow exploits.

To manage the process, the operating system kernel also creates several kernel structures, and in particular, a virtual address space (vas) data structure. The vas data structure contains information about the virtual address space allocated to the process and maintains a list of process region structures called pregions.

Each pregion represents a specific segment of a process's allocated virtual address space and contains the virtual addresses to which the process's pages are mapped, page types, and page protections. Each pregion is defined as a particular pregion type based on a p-TYPE entry located within the pregion structure. The p-TYPE entry defines the specific segment of a process's allocated virtual address space, e.g., text, heap, stack, and shared memory, and can be used to determine characteristics of a given process. Particular examples of pregion types (with p-TYPE entry in parentheses) include: text (PT_TEXT); heap (PT_HEAP); stack (PT_STACK); and shared memory (PT_SHMEM).

In the present embodiment, detection application 106 is stored in memory 112 of host computer system 102 and executed on host computer system 102. The particular type and configuration of host computer system 102, server computer system 130, and hacker computer system 128 are not essential to this embodiment of the present invention.

FIG. 2 illustrates a flow diagram of a method 200 implemented by detection application 106 in accordance with one embodiment of the invention. Referring now to FIGS. 1 and 2 together, execution of detection application 106 by processor 108 results in the operations of host computer method 200 as described below in one embodiment.

In the present embodiment, detection application 106 including method 200 is loaded as a kernel module into memory 112 of host computer system 102, and executed by processor 108 of host computer system 102. From an ENTER operation 202, processing transitions to a HOOK CRITICAL OS FUNCTION(S) operation 204.

In HOOK CRITICAL OS FUNCTION(S) operation 204, critical operating system (OS) function(s) of host computer system 102 are hooked. In the present embodiment, at least one critical OS function of host computer system 102 is hooked.

Herein, in one embodiment, a critical OS function is any operating system function used to create another process and allocate process space in memory. Examples of critical OS functions in a HP-UX operating system include the system functions exec, execv, execve, and execvl, however other operating system functions can also be included.

As is well known to those of skill in the art, hooking a function allows a process to intercept a particular function on a program wide or operating system wide basis prior to execution. In various embodiments, a system level driver module, such as a kernel mode module or kernel mode driver module, hooks the critical OS function(s) so that calls to the critical OS function(s) are redirected to detection application 106.

In one embodiment, critical OS function(s) are hooked in a system call table utilized by operating system 104. As is well known to those of skill in the art, a system call table relates system calls, such as calls to critical OS function(s), with associated functions within the operating system.

As is further well known to those of skill in the art, direct access to kernel mode functions, such as critical OS functions, by user mode applications is not permitted. A system call provides an interface between the user mode and kernel mode to provide user mode access to the kernel mode functions. System calls include calls to critical OS functions and calls to non-critical OS functions.

To access a critical OS function from user mode, a user application (as well as any injected code resulting from a buffer overflow) needs to originate a system call, and in particular, a call to the critical OS function (herein also termed a critical OS function call). In one embodiment, by hooking a critical OS function, a critical OS function call is redirected to detection application 106, for example, to a hook module of detection application 106, rather than to the called critical OS function. In one embodiment, the system call table is hooked by replacing an original pointer to the location of a critical OS function with a replacement pointer to the location of detection application 106 (e.g., to the location of a hook module of detection application 106).

Once the critical operating system function(s) are hooked, method 200 waits until a call to a hooked critical operating system function, such as a call to the function exec, is originated and redirected to detection application 106. From HOOK CRITICAL OS FUNCTION(S) operation 204, processing transitions to a STALL CRITICAL OS FUNCTION CALL operation 206.

In STALL CRITICAL OS FUNCTION CALL operation 206, a call to a critical OS function is stalled, i.e., is prevented from reaching the operating system. In particular, a call to a critical OS function is originated by a call module from a location in virtual memory and stalled prior to its execution by the operating system. In one embodiment a call module is any code that can originate a call to an operating system function. By stalling the critical OS function call, execution of the critical OS function is stalled. From STALL CRITICAL OS FUNCTION CALL operation 206, processing transitions to a DETERMINE VADDR operation 208.

In DETERMINE VADDR operation 208, the virtual address (vaddr) of the location from which the critical OS function call originated is determined. In particular, the user mode virtual address of the call module originating the critical OS function call is determined. In one embodiment, a virtual address (vaddr) is a memory location in virtual memory that is accessed by a process (e.g., a program) in a computer system with virtual memory. The hardware of the computer system (e.g., host computer system 102) maps the virtual address to a location in physical memory. A virtual address (vaddr) is well known to those of skill in the art and not further described to avoid detracting from the principles of the invention.

In one embodiment, the virtual address of the call module is obtained from the program counter. In one embodiment, the virtual address is obtained using:

vaddr=get program counter;.

A program counter is well known to those of skill in art and not further described to avoid detracting from the principles of the invention. From DETERMINE VADDR operation 208, processing transitions to a DETERMINE VAS operation 210.

In DETERMINE VAS operation 210, the virtual address space (vas) allocated to the current process is obtained from the kernel. As earlier described, in one embodiment, the virtual address space is a range of memory locations in virtual memory. The virtual address space is divided into logical segments of virtually contiguous pages that are mapped to physical addresses in memory (which may not be contiguous). The virtual address space is well known to those of skill in the art and not further described herein to avoid detracting from the principles of the invention.

In one embodiment, from the global variable "u", representing user area on the HP-UX operating system, the virtual address space of the currently running process can be found using:

proc_t*curproc=(proc_t*)u.u_procp;
struct vas *p_vas=_(curproc);.

From DETERMINE VAS operation 210, processing transitions to a DETERMINE PREGION operation 212.

In DETERMINE PREGION operation 212, the pregion to which the virtual address of the originator of the critical OS function call (in the allocated virtual address space) belongs is determined. As earlier described, in one embodiment, each pregion represents a specific segment of a process's allocated virtual address space and contains the virtual addresses to which the process's pages are mapped, page types, and page protections. Pregions are well known to those of skill in the art and are not further described to avoid detracting from the principles of the invention.

In one embodiment, the pregion is determined using the vaddr and the vas, for example by using:

struct pregion *p_preg=findpreg(p_vas, 0, vaddr, 0);.

From DETERMINE PREGION operation 212, processing transitions to a DETERMINE PREGION TYPE operation 214.

In DETERMINE PREGION TYPE operation 214, the type of the pregion (also called herein the pregion type) is determined. As earlier described, in one embodiment, a pregion type defines a pregion as associated with a specific segment of a process's allocated virtual address space, e.g., text, heap, stack, and shared memory, and can be used to determine characteristics of a given process. Pregion types are well known to those of skill in the art and are not further described to avoid detracting from the principles of the invention.

In one embodiment, the pregion type is obtained from the pregion pointer, p_preg. A pregion pointer is well known to those of skill in art and not further described to avoid detracting from the principles of the invention. From DETERMINE PREGION TYPE operation 214, processing transitions to a PREGION TYPE STACK OR HEAP check operation 216.

In PREGION TYPE STACK OR HEAP check operation 216, a determination is made whether the pregion type of the pregion is a stack or a heap pregion type (e.g., PT_STACK or PT_HEAP). When the pregion type is not determined to be a stack or a heap pregion type ("NO"), the critical OS function call did not originate from a location in either a stack or a heap segment of the allocated virtual address space (and instead assumedly originated from a text or a shared memory segment). Thus, the critical OS function call is not assumed to be indicative of malicious code as executable code normally originates from locations in text or shared memory segments. Consequently, the critical OS function call is assumed to originate from a non-malicious call module (i.e., not associated with malicious code), and processing transitions from PREGION TYPE STACK OR HEAP check operation 216 to a RELEASE CRITICAL OS FUNCTION CALL operation 224.

In RELEASE CRITICAL OS FUNCTION CALL operation 224, the critical OS function call is allowed to proceed. More particularly, the critical OS function call is passed to operating system 104, and from RELEASE CRITICAL OS FUNCTION CALL operation 224, processing transitions to an EXIT operation 222, with processing exit method 200 or waiting for a next critical OS function call and returning to operation 206.

Referring again to PREGION TYPE STACK OR HEAP check operation 216, alternatively, when the pregion type is a stack or a heap pregion type ("YES"), the critical OS function call originated from a location in either a stack or a heap segment of the allocated virtual address space. Thus, the critical OS function call is assumed to be indicative of malicious code (for example, the result of buffer overflow code) as executable code normally does not originate from a location in stack or heap segments. Consequently, the critical OS function call is assumed to originate from a malicious call module (i.e., is associated with malicious code), and processing transitions from PREGION TYPE STACK OR HEAP check operation 216 to a PROTECTIVE ACTION operation 218.

In PROTECTIVE ACTION operation 218, protective action is taken to prevent the critical OS function call from causing damage to or exploiting host computer system 102. For example, the critical OS function call is terminated. More particularly, the critical OS function call is not passed to the operating system but is terminated. In one embodiment, the user is prompted for input prior to taking protective action, e.g., the user is asked for permission to take protective action.

By terminating the critical OS function call, the spawning of another process (e.g., a malicious process) is prevented, thus preventing unauthorized access by malicious hackers as well as by replicating malicious code (e.g., computer worms). From PROTECTIVE ACTION operation 218, processing optionally transitions to a NOTIFY operation 220, or directly to EXIT operation 222 as earlier described, if optional NOTIFY operation 220 is not performed.

In NOTIFY operation 220, a user of host computer system 102 and/or a system administrator are notified that protective action has been taken on host computer system 102. The user and/or system administrator can be notified using any one of a number of techniques, such as by using a pop up window, by writing to a file, and/or otherwise by logging the event. Further, a notification can be provided to a security center. From NOTIFY operation 220, processing transitions to EXIT operation 222 with processing exiting method 200 or waiting for a next critical OS function call and returning to operation 206.

By way of example, in one embodiment, the following code can be used in determining whether the pregion type is a stack or a heap pregion type, and if so, providing a notification and denying access:

```
if    ((p_preg->p_type==PT_STACK)||(p_preg->p_type
==PT_HEAP))
{
Write_Debug("Possible  Buffer  Overflow  Execution
    attempt detected\n");
return EACCES; //Access denied
}.
```

Figure 3:
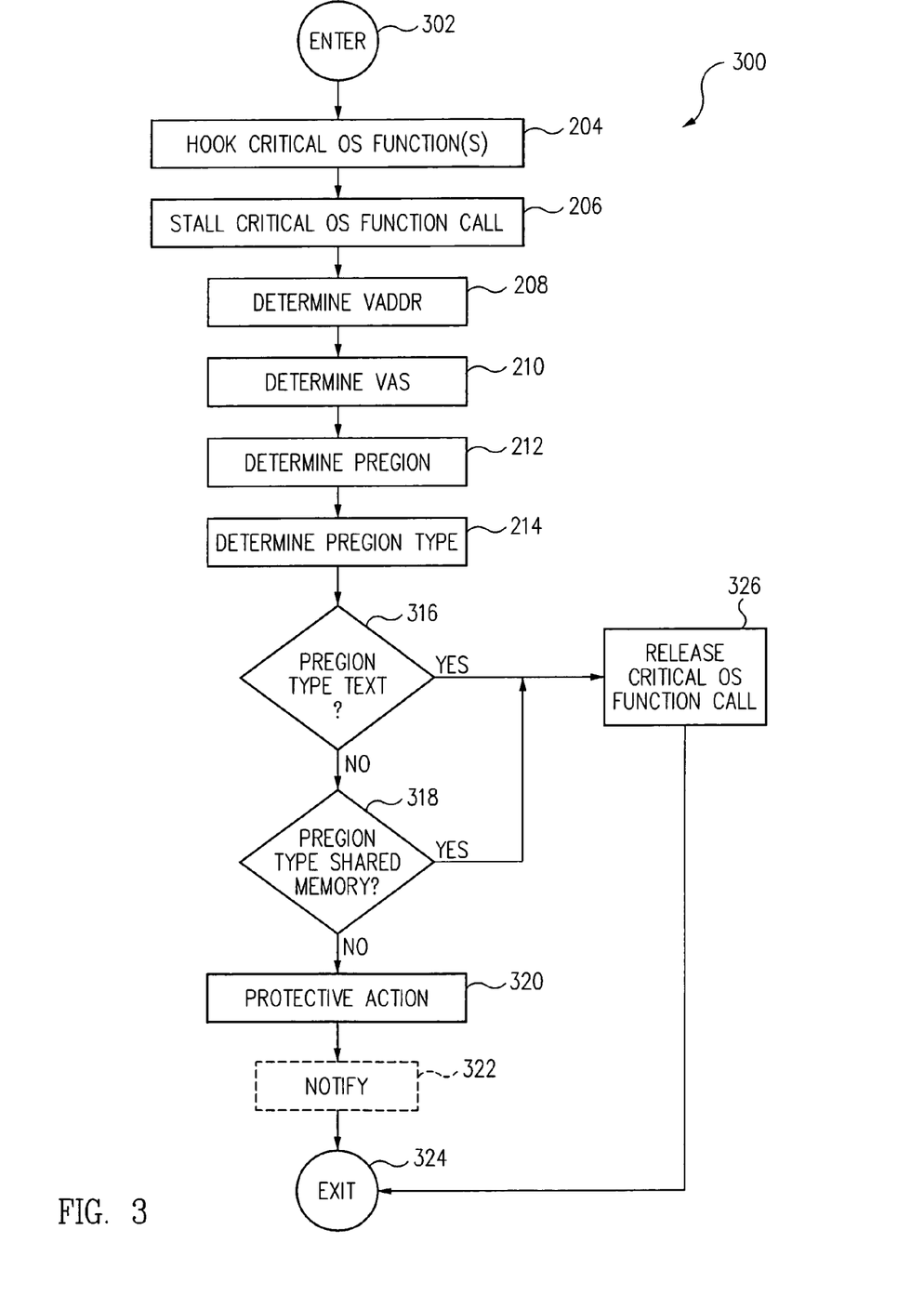
FIG. 3 illustrates a flow diagram of a method implemented by the detection application of FIG. 1 in accordance with another embodiment of the invention.

In an alternative embodiment, rather than detecting code executing from locations in either stack or heap segments, code not executing from a location in either a text or a shared memory segment is detected as further described herein with reference to FIG. 3.

FIG. 3 illustrates a process flow diagram of a method 300 implemented by detection application 106 in accordance with another embodiment of the invention. Referring now to FIGS. 1, 2 and 3 together, execution of detection application 106 by processor 108 results in the operations of host computer method 300 as described below in one embodiment.

In the present embodiment, detection application 106 including method 300 is loaded as a kernel module into memory 112 of host computer system 102, and executed by processor 108 of host computer system 102. From an ENTER operation 302, processing transitions to HOOK CRITICAL OS FUNCTION(S) operation 204.

In the present alternative embodiment of method 300, operations 204, 206, 208, 210, 212, and 214 are performed as earlier described with reference to method 200, herein incorporated by reference. From DETERMINE PREGION TYPE operation 214, processing transitions to a PREGION TYPE TEXT check operation 316.

In PREGION TYPE TEXT check operation 316, a determination is made whether the pregion type determined in DETERMINE PREGION TYPE operation 214 is a text pregion type. When the pregion type is determined to be a text pregion type ("YES"), the critical OS function call originated from a location in a text segment of the allocated virtual address space. Thus, the critical OS function call is not assumed to be indicative of malicious code, as executable code normally originates from a location in a text segment. Consequently, the critical OS function call is assumed to originate from a non-malicious call module, and processing transitions from PREGION TYPE TEXT check operation 316 to a RELEASE CRITICAL OS FUNCTION CALL operation 326 as earlier described with reference to RELEASE CRITICAL OS FUNCTION CALL operation 224 of method 200, herein incorporated by reference. Alternatively, when the pregion type is not a text pregion type ("NO"), the critical OS function call is assumed to originate from either stack, heap, or shared memory segments of the allocated virtual address space, and processing transitions from PREGION TYPE TEXT check operation 316 to a PREGION TYPE SHARED MEMORY check operation 318.

In PREGION TYPE SHARED MEMORY check operation 318, a determination is made whether the pregion type is a shared memory pregion type. When the pregion type is determined to be a shared memory pregion type ("YES"), the critical OS function call originated from a location in a shared memory segment of the allocated virtual address space. Thus, the critical OS function call is not assumed to be indicative of malicious code as executable code normally originates from a location in a shared memory segment. Consequently, the critical OS function call is assumed to originate from a non-malicious call module, and processing transitions from PREGION TYPE SHARED MEMORY check operation 318 to RELEASE CRITICAL OS FUNCTION CALL operation 326 as earlier described.

Alternatively, when the pregion type is not a shared memory pregion type ("NO"), the critical OS function call is assumed to originate from a location in a stack or a heap segment of the allocated virtual address space (as it was earlier determined that the critical OS function call did not originate from a location in a text or a shared memory segment). Thus, the critical OS function call is assumed to be indicative of malicious code (for example, the result of buffer overflow code) as executable code normally does not originate from a location in a stack or heap segment. Consequently, the critical OS function call is assumed to originate from a malicious call module, and processing transitions from PREGION TYPE SHARED MEMORY check operation 318 to a PROTECTIVE ACTION operation 320.

In PROTECTIVE ACTION operation 320, protective action is taken to prevent the critical OS function call from causing damage to or exploiting host computer system 102 as earlier described with reference to PROTECTIVE ACTION operation 218 of method 200 hereby incorporated by reference. From PROTECTIVE ACTION operation 320, processing optionally transitions to a NOTIFY operation 322, or directly to EXIT operation 324 as earlier described if NOTIFY operation 322 is not performed.

In NOTIFY operation 322, a user of host computer system 102 and/or a system administrator are notified that protective action has been taken on host computer system 102. The user and/or system administrator can be notified using any one of a number of techniques, such as by using a pop up window, by writing to a file, and/or otherwise by logging the event. Further, a notification can be provided to a security center. From NOTIFY operation 322, processing transitions to EXIT operation 324 with processing exiting method 300 or waiting for a next critical OS function call and returning to operation 206.

By way of example, in one embodiment, the following code can be used in determining whether the pregion type is a text or shared memory pregion type, and if not, to provide a notification and deny access:

```
if (p_preg→p_type!=PT_TEXT)
if ((p_preg→p_type!=PT_SHMEM)||
   (p_preg→p_type!=PT_ANON_SHMEM))
{
    Write_Debug("Possible Buffer Overflow Execution
       attempt detected\n");
       return EACCES; //Access denied
}.
```

In an alternative embodiment of method 300, a determination is made whether the pregion type is a shared memory pregion type and if so (YES), the stack is traversed to determine if the critical OS function call, such as a call to exec (which assumedly originated from a location in a shared memory segment) has actually originated from there. This alternative embodiment of method 300 can be used to detect return-to-libc types of buffer overflow attacks. If the critical OS function call originated from a location in a text segment of the stack (i.e., a text pregion type), then the critical OS function call is allowed to execute, e.g., is released, otherwise, a possible buffer overflow execution attempt is assumed and protective action is taken, such as terminating the critical OS function call.

Figure 4:
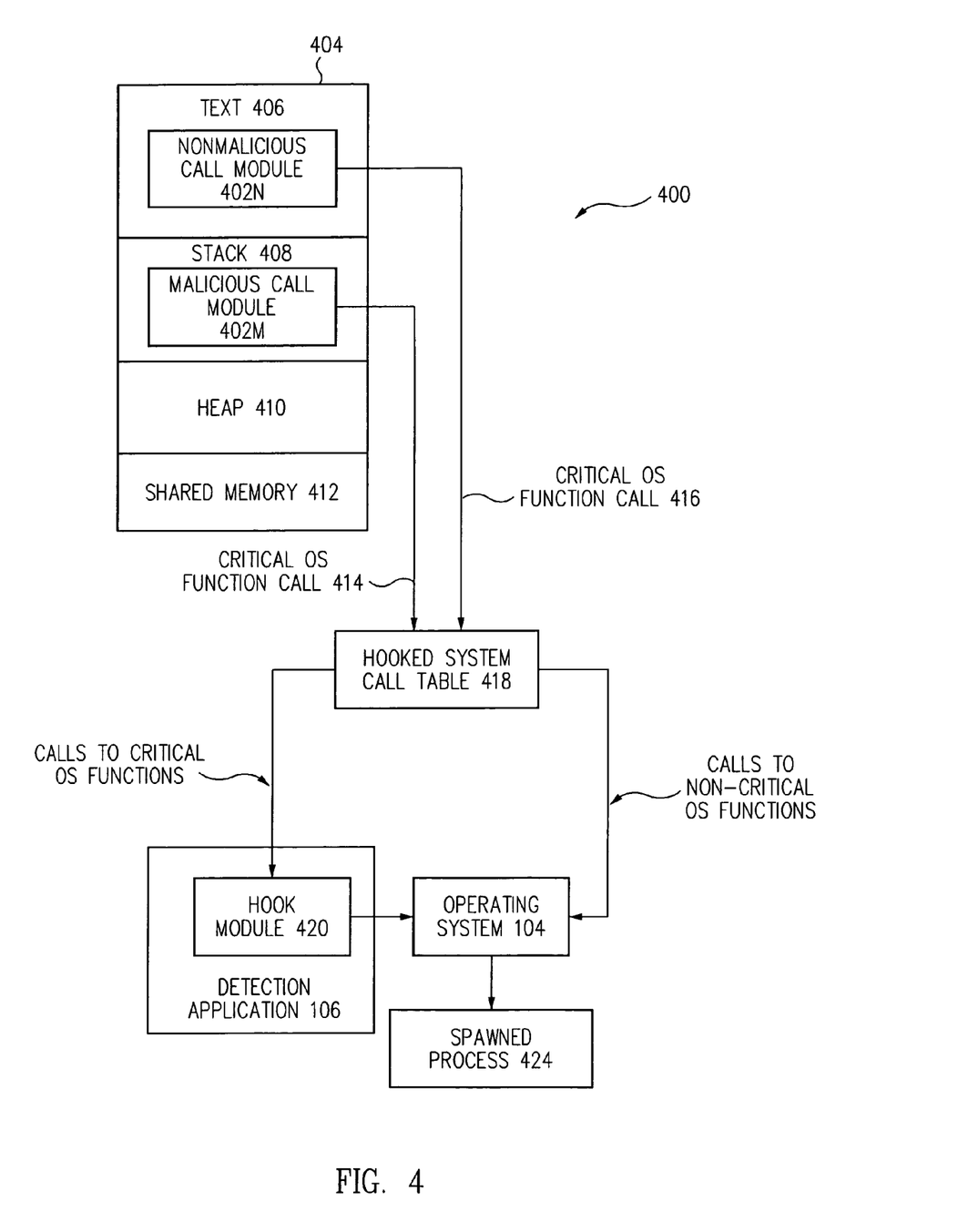
FIG. 4 is a diagram of a hooked critical operating system function call flow in accordance with one embodiment of the present invention.

FIG. 4 is a diagram of a hooked critical operating system function call flow 400 in accordance with one embodiment of the present invention. Call flow 400 is described herein with reference to method 200 for example, however the principles described with reference to FIG. 4 are applicable to method 300 as well. Referring now to FIGS. 2 and 4 together, a currently running process is allocated a virtual address space 404 containing the segments: text 406, stack 408, heap 410, and shared memory 412. By exploiting a buffer overflow, for example, through a buffer overflow exploit from hacker computer system 128 (FIG. 1), a malicious call module 402M containing malicious code is loaded into stack 408 segment of virtual address space 404.

During execution, malicious call module 402M originates a critical OS function call 414, for example a call to exec, in order to spawn another process, such as spawned process 424. Critical OS function call 414 is routed to a hooked system call table 418. Hooked system call table 418 routes non-critical OS function calls to the operating system 104. However, hooked system call table 418 routes critical OS function calls, such as critical OS function call 414, to a hook module 420 of detection application 106.

In one embodiment, hook module 420 stalls critical OS function calls during STALL CRITICAL OS FUNCTION CALL operation 206. Further hook module 420 continues to stall the critical OS function call until processing transitions to RELEASE CRITICAL OS FUNCTION CALL operation 224, or until processing transitions to PROTECTIVE ACTION operation 218.

In accordance with this embodiment, a determination is made that the location of malicious call module 402M is associated with a stack pregion type, and thus is assumed to be malicious. Hook module 420 terminates critical OS function call 414 in PROTECTIVE ACTION operation 218, and optionally a notification is provided in NOTIFY operation 220. By terminating critical OS function call 414, spawning of another process, such as spawned process 424, is prevented. Consequently, unauthorized access to host computer system 102 (FIG. 1) by malicious hackers and replicating malicious code, such as computer worms, is prevented.

In contrast, a non-malicious call module 402N (e.g., which does not include malicious code) is loaded into text 406 segment of virtual address space 404. During execution, non-malicious call module 402N originates a critical OS function call 416, for example a call to exec. Critical OS function call 416 is routed to hooked system call table 418. Hooked system call table 418 routes critical OS function call 416 to hook module 420 of detection application 106. Hook module 420 stalls critical OS function call 416 in STALL CRITICAL OS FUNCTION CALL operation 206.

In accordance with this embodiment, a determination is made that the location of the non-malicious call module 402N is not associated with a stack or a heap pregion type (e.g., is assumedly either a text or a shared memory pregion type), and thus is not assumed to be malicious. Hook module 420 allows critical OS function call 416 to proceed in RELEASE CRITICAL OS FUNCTION CALL operation 224. Accordingly, critical OS function call 416 is routed from hook module 420 to operating system 104 and spawned process 424 is created.

Figure 5:
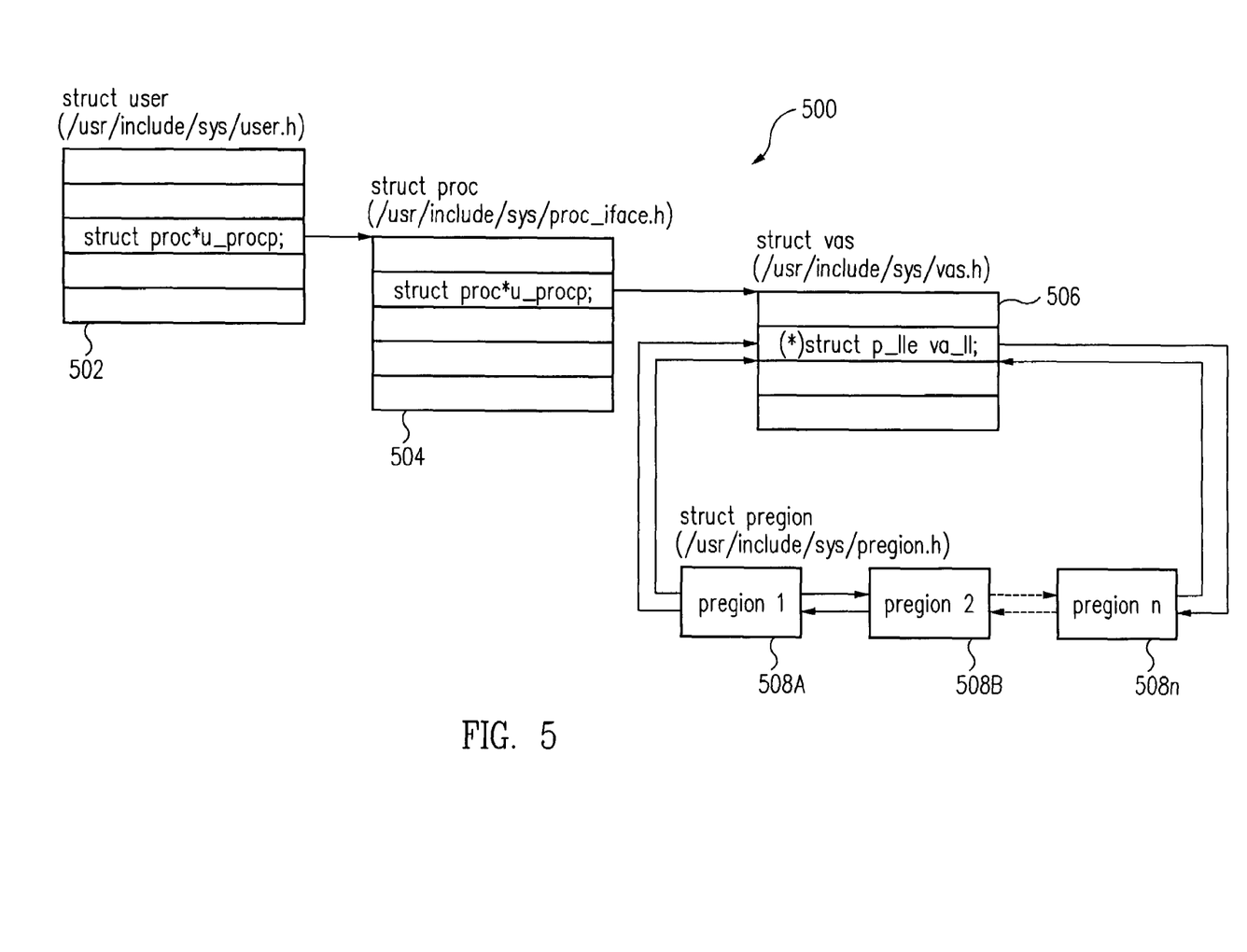
FIG. 5 is a diagram of kernel data structures illustrating the relationship between user areas and pregions in accordance with one embodiment of the invention.

FIG. 5 is a diagram 500 of kernel data structures illustrating the relationship between user areas and pregions in accordance with one embodiment of the invention. In FIG. 5, the user structure 502 is a kernel structure describing memory allocated to a particular user. User structure 502 includes a pointer (e.g., struct proc*u_procp;) to a process structure 504 of a currently executing process.

Process structure 504 is a kernel structure representing the memory area allocated to a particular process that is currently executing within the user area. The process structure 504 includes a pointer (e.g., struct proc*u_procp;) to a vas structure 506.

Vas structure 506 describes the virtual address space allocated to the process that is currently executing. Vas structure 506 provides the virtual address space information used with the virtual address of call module to determine a pregion in DETERMINE PREGION operation 212. The vas structure 506 includes a pointer (e.g., (*)struct p_lle va_ll;) to pregion structures 508A-508n.

Each pregion structure 508A-508n includes its pregion type (e.g., PT_TEXT, PT_HEAP, PT_STACK, or PT_SH-MEM) and information about its associated pages. The pregion type information is used in determining whether a call module is malicious or non-malicious (i.e., is indicative of malicious code or not, respectively).

Thus, in accordance with the invention, a call to a critical OS function is originated from a call module of a currently executing process and is stalled by detection application 106. The user mode virtual address (vaddr) of the location of the call module is determined, and the virtual address space allocated to the currently executing process is determined. Utilizing the user mode virtual address and virtual address space, the pregion associated with the virtual address in the virtual address space is determined, and the pregion type.

In accordance with method 200, if the pregion type is a stack or a heap pregion type, the critical OS function call is assumed to be from a malicious call module and protective action is taken, such as terminating the call. Otherwise, if the pregion type is not a stack or a heap pregion type, the critical OS function call is assumed to be from a non-malicious call module (e.g., from a text or a shared memory pregion type), and the critical OS function call is released.

In accordance with method 300, if the pregion type is a text or a shared memory pregion type, the critical OS function call is assumed to be from a non-malicious call module, and the critical OS function call is released. Otherwise, if the pregion type is not a text or a shared memory pregion type, the critical OS function call is assumed to be from a malicious call module (e.g., from a stack or a heap pregion type), and protective action is taken.

Referring again to FIG. 1, detection application 106 is in computer memory 112. As used herein, a computer memory refers to a volatile memory, a non-volatile memory, or a combination of the two.

Although detection application 106 is referred to as an application, this is illustrative only. Detection application 106 should be capable of being called from an application or the operating system.

In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for host computer and client-server configurations, embodiments of the present invention may be carried out using any suitable means and/or hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, and servers on a network. Further herein, a means for performing a particular function is accomplished using the appropriate computer-readable code and the related hardware necessary to performing the function.

As illustrated in FIG. 1, this medium may belong to the computer system itself. However, the medium also may be removed from the computer system. For example, detection application 106 may be stored in memory 136 that is physically located in a location different from processor 108. Processor 108 should be coupled to memory 136. This could be accomplished in a client-server system, or alternatively via a connection to another computer via modems and analog lines, or digital interfaces and a digital carrier line.

More specifically, in one embodiment, host computer system 102 and/or server computer system 130 is a portable computer, a workstation, a two-way pager, a cellular telephone, a digital wireless telephone, a personal digital assistant, a server computer, an Internet appliance, or any other device that includes components that can execute the pregion type determination functionality in accordance with at least one of the embodiments as described herein. Similarly, in another embodiment, host computer system 102 and/or server computer system 130 is comprised of multiple different computers, wireless devices, cellular telephones, digital telephones, two-way pagers, or personal digital assistants, server computers, or any desired combination of these devices that are interconnected to perform, the processes as described herein.

In view of this disclosure, the embodiments of the present invention can be implemented in a wide variety of computer system configurations. In addition, the embodiments of the present invention can be stored as different modules in memories of different devices.

For example, detection application 106 could initially be stored in server computer system 130, and then as necessary, a portion of detection application 106 could be transferred to host computer system 102 and executed on host computer system 102. Consequently, part of detection application 106 would be executed on processor 134 of server computer system 130, and another part would be executed on processor 108 of host computer system 102. In view of this disclosure, those of skill in the art can implement various embodiments of the present invention in a wide-variety of physical hardware configurations using an operating system and computer programming language of interest to the user.

In yet another embodiment, detection application 106 is stored in memory 136 of server computer system 130. Detection application 106 is transferred over network 126 to memory 112 in host computer system 102. In this embodiment, network interface 138 and I/O interface 110 would include analog modems, digital modems, or a network interface card. If modems are used, network 126 includes a communications network, and detection application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method comprising:
    hooking at least one critical operating system function;
    stalling a call to said at least one critical operating system function, said call originating from a call module at a location in a virtual address space allocated to a process;
    determining a pregion associated with said location; and
    determining a pregion type of said pregion.

2. The method of claim 1, further comprising:
    determining whether said pregion type is one of a stack pregion type and a heap pregion type;

wherein when said pregion type is one of said stack pregion type and said heap pregion type, taking protective action; and wherein when said pregion type is not one of said stack pregion type and said heap pregion type, releasing said call.

3. The method of claim 1, further comprising:

determining whether said pregion type is a text pregion type;

wherein when said pregion type is said text pregion type, releasing said call;

wherein when said pregion type is not said text pregion type, determining whether said pregion type is a shared memory pregion type;

wherein when said pregion type is said shared memory pregion type, releasing said call; and wherein when said pregion type is not said shared memory pregion type, taking protective action.

4. A method comprising:

stalling a call to an operating system function, said call originating from a call module at a location in a virtual address space allocated to a process;

determining a virtual address of said call module;

determining a virtual address space of said process;

determining a pregion associated with said virtual address;

determining a pregion type of said pregion;

determining whether said pregion type is one of a stack and a heap pregion type; and wherein when said pregion type is one of said stack pregion type and said heap pregion type, taking protective action.

5. The method of claim 4, further comprising:

wherein when said pregion type is not one of said stack pregion type and said heap pregion type, releasing said call.

6. The method of claim 4, further comprising:

wherein said operating system function is a critical operating system function, and further wherein said call is a critical operating system function call.

7. The method of claim 4, further comprising:

wherein said operating system function is a function which when executed spawns another process.

8. The method of claim 4, further comprising:

hooking said operating system function.

9. The method of claim 4, further comprising:

providing a notification.

10. A method comprising:

stalling a call to an operating system function, said call originating from a call module of a process;

determining a virtual address of said call module;

determining a virtual address space of said process;

determining a pregion associated with said virtual address;

determining a pregion type of said pregion;

determining whether said pregion type is a text pregion type;

wherein when said pregion type is not said text pregion type, determining whether said pregion type is a shared memory pregion type; and wherein when said pregion type is not said shared memory pregion type, taking protective action.

11. The method of claim 10, further comprising:

wherein when said pregion type is said text pregion type, releasing said call.

12. The method of claim 10, further comprising:

wherein when said pregion type is said shared memory pregion type, releasing said call.

13. The method of claim 10, further comprising:

wherein said operating system function is a critical operating system function, and further wherein said call is a critical operating system function call.

14. The method of claim 10, further comprising:

wherein said operating system function is a function which when executed spawns another process.

15. The method of claim 10, further comprising:

hooking said operating system function.

16. The method of claim 10, further comprising:

providing a notification.

17. A computer-program product comprising a computer readable storage medium containing computer program code comprising:

means for stalling a call to at least one critical operating system function, said call originating from a call module at a location in a virtual address space allocated to a process;

means for determining a pregion associated with said location; and means for determining a pregion type of said pregion.

18. The computer-program product of claim 17, further comprising:

means for determining whether said pregion type is one of a stack and a heap pregion type;

wherein when said pregion type is one of said stack pregion type and said heap pregion type, means for taking protective action; and wherein when said pregion type is not one of said stack pregion type and said heap pregion type, means for releasing said call.

19. The computer-program product of claim 17, further comprising:

means for determining whether said pregion type is a text pregion type;

wherein when said pregion type is said text pregion type, means for releasing said call;

wherein when said pregion type is not said text pregion type, means for determining whether said pregion type is a shared memory pregion type;

wherein when said pregion type is said shared memory pregion type, means for releasing said call; and wherein when said pregion type is not said shared memory pregion type, means for taking protective action.

20. The computer-program product of claim 17, further comprising:

means for hooking said at least one critical operating system function.

* * * * *